United States Patent [19]

Cameron

[11] Patent Number: 4,661,795

[45] Date of Patent: Apr. 28, 1987

[54] VEHICLE REAR LIGHTING SYSTEM DISPLAYING RED COLORED LIGHT ONLY DURING BRAKING

[76] Inventor: David L. Cameron, P.O. Box 10616, Westside Sta., Daytona Beach, Fla. 32014

[21] Appl. No.: 895,290

[22] Filed: Aug. 11, 1986

Related U.S. Application Data

[63] Continuation of Ser. No. 649,739, Sep. 12, 1984, abandoned.

[51] Int. Cl.[4] .............................................. B60Q 1/26
[52] U.S. Cl. ........................................ 340/71; 340/66; 340/72; 340/73; 340/78
[58] Field of Search ...................... 340/72, 66, 67, 69, 340/71, 73, 74, 78; 307/10 LS

[56] References Cited

U.S. PATENT DOCUMENTS

| | | | |
|---|---|---|---|
| 3,596,244 | 7/1971 | Litke | 340/72 |
| 3,949,361 | 4/1976 | Replogle | 340/66 |
| 4,037,195 | 7/1977 | Wojslawowicz | 340/66 |
| 4,087,784 | 5/1978 | West | 340/66 |

Primary Examiner—Donnie L. Crosland

[57] ABSTRACT

Delayed perception of the brake signal, a significant contributing factor in many rear-end automotive vehicle collisions, is a problem not totally resolved by the addition of a red colored supplementary brake signal light. A more effective and esthetically superior approach is employed in the current invention, in which red colored light, and only red colored light, is displayed at the rear of a vehicle during braking; and further, in which non-red colored light, and only non-red colored light, can be displayed at the rear of said vehicle when the brake actuation means is not actuated. If illuminated, non-red tail lights and rear turn signal lights are extinguished during braking, replaced by red colored brake signal lights, one of which may flash to indicate an intended turn, said red colored lights being extinguished and said non-red colored lights being reilluminated upon release of the brake actuation means. Thus, the display of red colored light per se provides an unambiguous, immediately perceptible signal of braking.

5 Claims, 2 Drawing Figures

VEHICLE REAR LIGHTING SYSTEM DISPLAYING RED COLORED LIGHT ONLY DURING BRAKING

The current application constitutes a continuation of patent application Ser. No. 649,739, filed Sept. 12, 1984, now abandoned.

The current invention comprises an improvement of a rear lighting system for automotive vehicles first disclosed in patent application Ser. No. 649,739 now abandoned.

BACKGROUND OF THE INVENTION

In existing rear lighting systems for automotive vehicles, the display of red colored light to effect tail lights, and in some cases rear turn signal lights, in addition to the brake signal lights causes ambiguity that delays perception of the brake signal, said ambiguity being compounded by the display, during braking, of multiple red colored lights having different meanings. Delayed perception of the brake signal is a significant contributing factor in many rear-end automotive vehicle collisions.

The addition of a red colored supplementary brake signal light at eye level will be only partially effective in improving perceptibility of the brake signal. The plethora of red colored light displayed during normal night driving results in partial habituation of drivers to the color red, said habituation compromising the value of red colored light as the signal of braking, it being required that the said signal be a stimulus evoking an immediate response. In all prior rear lighting systems for automotive vehicles, the potential value of light color per se has been lost in the indiscriminate display of red colored light.

The current invention provides a truly unambiguous, immediately perceptible signal of braking by displaying red colored light only when the brake actuation means of a vehicle is actuated, the tail lights and rear turn signals being effected by light having non-red color. Since drivers would not be constantly exposed to red colored light during normal night driving, they would not be habituated to the color red, and could respond immediately to the appearance of red colored light as the signal of braking.

SUMMARY OF THE INVENTION

A rear lighting system for automotive vehicles is described in which actuating the brake actuation means actuates, either directly or indirectly, electric switching means to effect illumination of brake signal lamps, light emanating from said illuminated lamps being transmitted through material containing a red colored pigment, said pigment causing said light to be visible as red colored light, the display of red colored light comprising the signal of braking.

An additional object of the invention is to provide electric switching means, actuated by actuating the brake actuation means, to extinguish illuminated lamps effecting the tail lights and rear turn signal lights of an automotive vehicle, light emanating from said illuminated lamps being transmitted through material containing non-red colored pigment, said pigment causing said light to be visible as non-red colored light, said extinguishment of said tail lights and rear turn signal lights persisting only so long as the said brake actuation means is actuated, restored illumination of said lights occuring upon release of said brake actuation means.

A further object of the invention is to provide electric switching means, actuated by actuating the brake actuation means, to effect intermittent illumination of a brake signal lamp on the side of an actuated turn signal selector switch, light emanating from said intermittently illuminated lamp being transmitted through material containing a red colored pigment, said pigment causing said light to be visible as red colored light, said light color providing an immediately perceptible signal of braking, while said intermittent illumination provides the signal of an intended turn.

These and additional implied objects are accomplished by the current invention, the embodiment described herein comprising: lamps effecting non-red tail lights and rear turn signal lights, and lamps effecting red brake signal lights, said lamps being connected, through appropriate electric switching means, to a source of electrical energy such that red colored light, and only red colored light, is displayed at the rear of an automotive vehicle whenever the brake actuation means of the said vehicle is actuated; and further, such that non-red colored light, and only non-red colored light, can be displayed at the rear of said vehicle whenever the brake actuation means is not actuated.

BRIEF DESCRIPTION OF THE DRAWING

To illustrate and explain the invention, there are shown in the figures embodiments which/may in some applications be preferred, it being understood, however, that that the invention is not limited to the precise forms shown.

DETAILED DESCRIPTION

Figure 1:
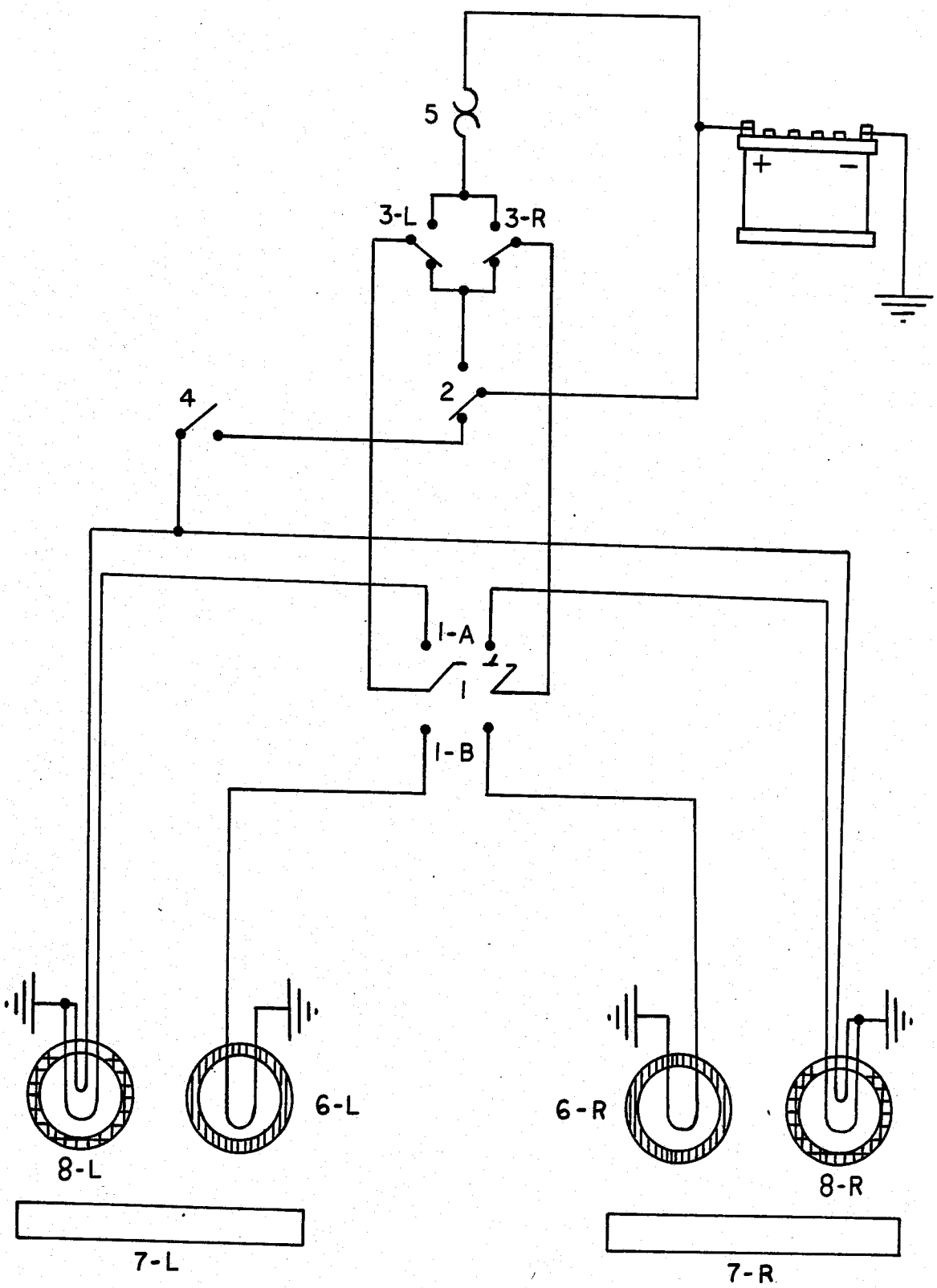
FIG. 1 is a schematic diagram of the electric circuit illustrating incorporation of a basic embodiment of the invention into the rear lighting system of an automotive vehicle, said embodiment comprising: a brake signal lamp and a bifunctional rear lamp on each side of the vehicle, said brake signal lamps being coated with material containing a red colored pigment, and said bifunctional lamps containing means to effect both the tail lights and the rear turn signal lights, and being coated with material containing a non-red colored pigment, such as an amber, yellow, orange, pink, or green colored pigment; and further comprising: two spring-loaded electric switching means actuated by actuation of the brake actuation means, one of said switching means being a single pole, double throw (SPDT) switch, and the other of said switching means being a double pole, double throw (DPDT) switch, actuation of the said electric switching means effecting illumination of said brake signal lamps and extinguishing said bifunctional rear lamps.

Illumination of lamps at the rear of an automotive vehicle is effected by flow of energizing electric current from a source of electrical energy, said flow of energizing electric current being effected by closure of electric circuits between said lamps and said source of electrical energy. The electric switches employed in the rear lighting system illustrated by FIG. 1 are shown in their normal positions, the normal position of the spring-loaded double pole, double throw (DPDT) switch 1 being in contact with terminals 1-A in the rear turn signal circuit. In the case that all electric switches are in their said normal positions, there is no flow of energizing electric current through rear lamps. Actuation of the brake actuation means actuates two spring-loaded electric switches, one of which is a single pole, double throw (SPDT) switch 2 and the other of which is the DPDT switch 1, said actuation closing electric circuits between the source of electrical energy and the left 6-L and right 6-R brake signal lamps, said closure of electric circuits enabling energizing electric current to constantly flow through said brake signal lamps, effecting constant illumination of said lamps, said lamps being coated with material containing a red colored pigment, said pigment causing light emanating from the said illuminated brake signal lamps to be transmitted as red colored light, said light being further transmitted as red colored light through colorless translucent screens 7-L and 7-R. The red colored light visible from behind the vehicle provides the signal of braking. Releasing the brake actuation means allows the spring-loaded SPDT switch 2 and the spring-loaded DPDT switch 1 to return to their normal positions, said return opening the electric circuits between the source of electrical energy and the brake signal lamps, thereby terminating current flow through, and illumination of, the said brake signal lamps.

In the case that the tail light switch 4 is actuated, and all other electric switches are in their normal positions, there are closed electric circuits between the source of electrical energy and bifunctional rear lamps 8-L and 8-R, said lamps containing means to effect both the tail lights and the rear turn signal lights of the vehicle, and further, said lamps being coated with material containing a non-red colored pigment. The said closed electric circuits enable energizing electric current to constantly flow through said bifunctional rear lamps, effecting constant illumination of the said lamps, said non-red colored pigment causing light emanating from said illuminated lamps to be transmitted as non-red colored light, said light being further transmitted as non-red colored light through colorless translucent screens 7-L and 7-R. Actuation of the brake actuation means actuates the SPDT switch 2 and the DPDT switch 1, said actuation of the SPDT switch 2 opening the electric circuits between the source of electrical energy and bifunctional rear lamps 8-L and 8-R, thereby terminating flow of energizing electric current through, and illumination of, said lamps; and further, said actuation of both the SPDT switch 2 and the DPDT switch 1 closing electric circuits between said source of electrical energy and the brake signal lamps 6-L and 6-R, said closure of electric circuits enabling energizing electric current to constantly flow through said brake signal lamps, said flow of electric current effecting constant illumination of the said brake signal lamps, light emanating from said illuminated lamps being transmitted as red colored light. Thus, when the brake actuation means is actuated, the non-red colored tail lights of the vehicle are extinguished and replaced by red colored brake signal lights. Releasing the brake actuation means allows the spring-loaded SPDT switch 2 and the spring-loaded DPDT switch 1 to return to their normal positions, said return opening electric circuits between the source of electrical energy and the brake signal lamps 6-L and 6-R, thereby terminating current flow through, and illumination of, said brake signal lamps; and further, said return closing electric circuits between said source of electrical energy and bifunctional rear lamps 8-L and 8-R, thereby effecting re-illumination of said bifunctional rear lamps, light emanating from said re-illuminated rear lamps being transmitted as non-red colored light. Thus, when the brake actuation means is released, the red colored brake signal lights are extinguished and replaced by the non-red colored tail lights.

In the case that the right turn selector switch 3-R is actuated, and all other electric switches are in their normal positions, there is an intermittently closed electric circuit between the source of electrical energy and the right bifunctional rear lamp 8-R, the flasher device 5 alternately opening and closing the said electric circuit, said circuit effecting intermittent flow of energizing electric current through said rear lamp 8-R, light emanating from said intermittently illuminated rear lamp being transmitted through material containing a non-red colored pigment, causing said light to be transmitted as non-red colored light. Actuation of the brake actuation means actuates the spring-loaded SPDT switch 2 and the spring-loaded DPDT switch 1, said actuation of the DPDT switch 1 opening the electric circuit to bifunctional rear lamp 8-R, thereby terminating intermittent illumination of said lamp 8-R; and further, said actuation of both the SPDT switch 2 and the DPDT switch 1 closing electric circuits between said source of electrical energy and the left 6-L and right 6-R brake signal lamps, the said closed circuit to the left brake signal lamp enabling energizing electric current to constantly flow through the said lamp, effecting constant illumination of lamp 6-L, light emanating from said illuminated lamp being transmitted through material containing a red colored pigment, said pigment causing said light to be transmitted as red colored light; and further, the said closed circuit to the right brake signal lamp 6-R, said circuit including the actuated right turn selector switch 3-R, enabling energizing electric current to intermittently flow through said brake signal lamp 6-R, effecting intermittent illumination of the said lamp, light emanating from said intermittently illuminated brake signal lamp being transmitted through material containing a red colored pigment, said pigment causing said light to be transmitted as red colored light. Thus, when the brake actuation means is actuated, the flashing non-red colored turn signal light on the right side of the vehicle is extinguished, and replaced by a constantly illuminated red colored brake signal light on the left side of the vehicle, and a flashing red colored brake signal light on the right side of the vehicle. Releasing the brake actuation means allows the spring-loaded SPDT switch 2 and the spring-loaded DPDT switch 1 to return to their normal positions, said return opening the electric circuits between the source of electrical energy and the left 6-L and right 6-R brake signal lamps, thereby terminating current flow through, and illumination of, the said brake signal lamps; and further, said return closing the electric circuit between said source of electrical energy and the right bifunctional rear lamp 8-R, thereby effecting resumed intermittent illumination of said lamp 8-R, light emanating from said intermittently illuminated lamp being transmitted as non-red colored light. Thus, when the brake actuation means is released, the steady red colored light on the left side of the vehicle and the flashing red colored light on the right side of the vehicle are extinguished, and the flashing non-red colored turn signal light on the right side of the vehicle is re-illuminated.

In the case that the left turn selector switch 3-L is actuated, the invention functions in an exactly analogous manner, there being intermittent illumination of the left bifunctional rear lamp 8-L, light emanating from said intermittently illuminated lamp being transmitted as non-red colored light. Actuation of the brake actuation means effects, by electric switching means described above, interruption of said illumination, and effects constant illumination of the right brake signal lamp 6-R and intermittent illumination of the left brake signal lamp 6-L, light emanating from said illuminated brake signal lamps being transmitted as red colored light. Releasing the brake actuation means terminates illumination of the said brake signal lamps, and restores intermittent illumination of the left bifunctional rear lamp 8-L, light emanating from said reilluminated lamp again being transmitted as non-red colored light.

Figure 2:
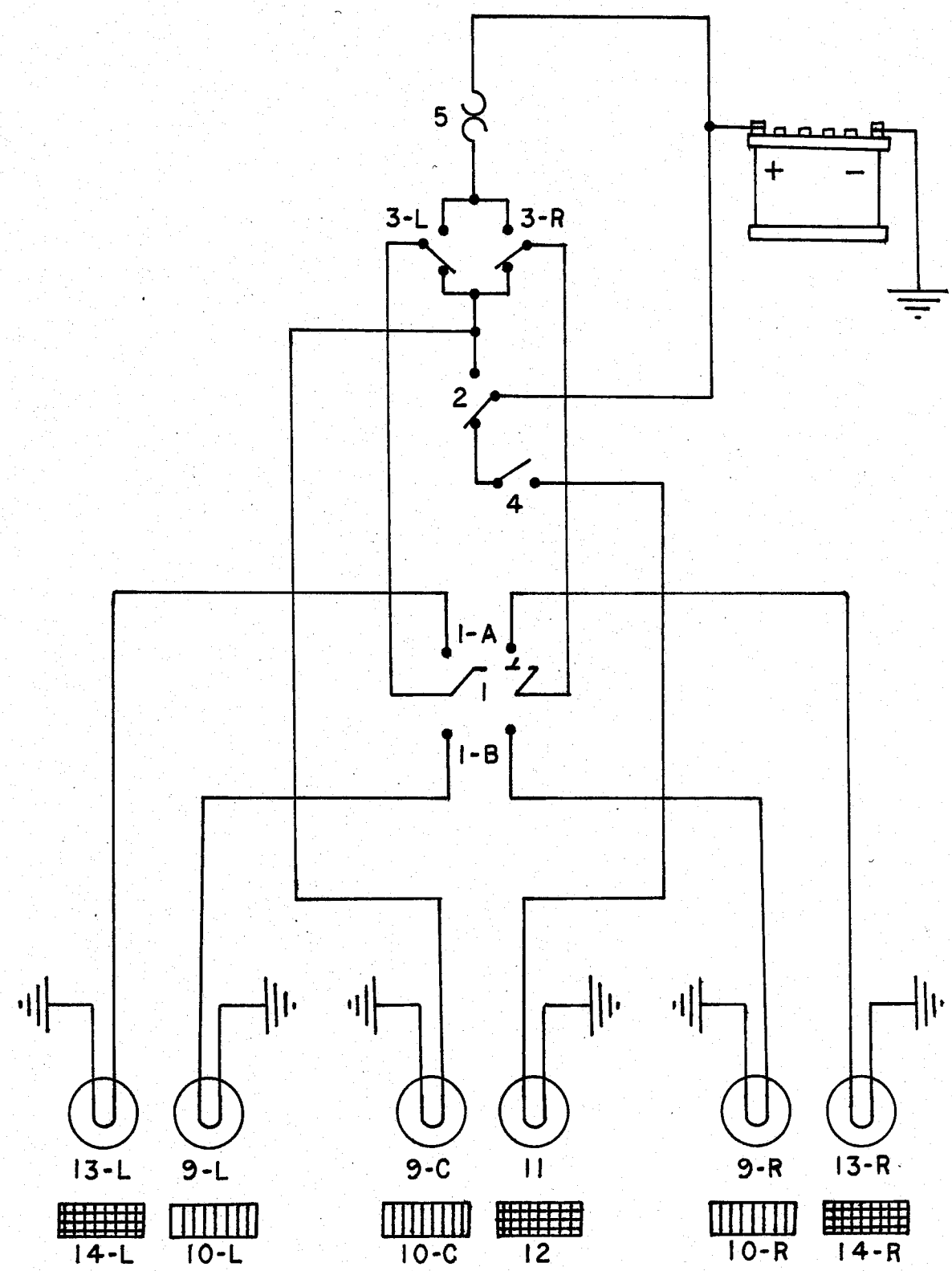
FIG. 2 illustrates an embodiment of the invention adapted for preferred incorporation into the rear lighting system of a two-wheeled automotive vehicle, said embodiment containing electric switching means as shown in FIG. 1, and further comprising: a brake signal lamp and a tail light lamp centered at the rear of the vehicle, and a brake signal lamp and a rear turn signal lamp on each side of the vehicle, light emanating from said illuminated brake signal lamps being transmitted through translucent screens containing a red colored pigment, and light emanating from said illuminated tail light lamp and rear turn signal lamps being transmitted through translucent screens containing a non-red pigment.

The function of the rear lighting system illustrated by FIG. 2 is exactly analogous to that described for the rear lighting system illustrated by FIG. 1, electric switching means in the two systems being functionally identical. When all electric switching means are in their normal positions, as shown in FIG. 2, the normal position of the spring-loaded DPDT switch 1 again being in contact with terminals 1-A, no rear lamps are illuminated. Actuation of the spring-loaded SPDT switch 2 and the spring-loaded DPDT switch 1, said actuation being effected by actuation of the brake actuation means, effects constant illumination of the left 9-L, right 9-R, and central 9-C brake signal lamps, light emanating from said illuminated brake signal lamps being transmitted through translucent screens 10-L, 10-R, and 10-C respectively, said translucent screens containing a red colored pigment, said pigment causing said light to be further transmitted as red colored light. Releasing the brake actuation means allows the SPDT switch 2 and the DPDT switch 1 to return to their normal positions, thereby terminating illumination of the said brake signal lamps. When tail light switch 4 is actuated, and all other switches are in their normal positions, tail light lamp 11 is constantly Illuminated light emanating from said illuminated lamp being transmitted through translucent screen 12 containing a non-red colored pigment, said pigment causing said light to be further transmitted as non-red colored light. Actuation of the brake actuation means extinguishes tail light lamp 11, and effects constant illumination of the brake signal lamps 9-L, 9-C, and 9-R, light emanating from said illuminated brake signal lamps being transmitted as red colored light. Releasing the brake actuation means then extinguishes said illuminated brake signal lamps, and re-establishes illumination of tail light lamp 11. When the brake actuation means is not actuated, actuation of one of the turn signal selector switches 3-L or 3-R effects intermittent illumination of the rear turn signal lamp 13-L or 13-R on the side of the actuated turn signal selector switch, light emanating from said intermittently illuminated lamp being transmitted through a translucent screen 14-L or 14-R containing a non-red colored pigment, said pigment causing said light to be further transmitted as non-red colored light. Actuation of the brake actuation means extinguishes said rear turn signal lamp 13-L or 13-R, and effects illumination of the brake signal lamps 9-L, 9-C, and 9-R, illumination of the lamp 9-L or 9-R on the side of the actuated turn signal selector switch being intermittent, while illumination of the remaining two brake signal lamps is constant. Releasing the brake actuation means extinguishes said brake signal lamps, and permits restored intermittent illumination of the rear turn signal lamp 13-L or 13-R on the side of the actuated turn signal selector switch.

The over-all objective of the invention is to eliminate ambiguity in brake signaling by vehicle rear lights, and to provide an immediately perceptible signal of braking by said lights. As described above, this is accomplished in two parts: first, by illuminating specific lamps only when the brake actuation means of a vehicle is actuated, and by causing light emanating from said illuminated lamps to be transmitted as red colored light, said light color being immediately perceptible as the signal of braking; and second, by extinguishing non-red colored tail lights and rear turn signal lights during braking, thereby emphasizing the signal of braking, said extinguished lights reappearing upon release of the brake actuation means.

It is to be understood that the forms of the invention herewith shown and described comprise preferred embodiments, but not the only possible forms of the invention. Additional means, such as fabricating the lamps themselves from material containing appropriately colored pigments, might be used to impart color to light emanating from illuminated lamps. The number and arrangement of rear lamps might differ from those illustrated in the figures. Appropriate electric switching means might be directly actuated by actuation of the brake actuation means, or might be indirectly actuated by the same action, for example, by increased pressure in hydraulic brake lines resulting from actuation of the brake actuation means. Such variations in form clearly fall within the spirit and scope of the current invention.

What is claimed is:

1. A method for displaying red colored light at the rear of an automotive vehicle only during braking, including the following electrical components:
 a source of electrical energy;
 manually actuated left and right turn signal selector switches;
 a turn signal flasher device for automatically opening and closing electric circuits between said source of electrical energy and said turn signal selector switches;
 a manually actuated tail light switch;
 manually actuated brake actuation means;
 lamps illuminated by the flow of energizing electric current to effect the tail lights of said vehicle, light emanating from said illuminated lamps being transmitted through material containing a non-red colored pigment;
 lamps illuminated by the flow of energizing electric current to effect the rear turn signal lights of said vehicle, light emanating from said illuminated lamps being transmitted through material containing a non-red colored pigment;
 lamps illuminated by the flow of energizing electric current to effect the brake signal lights of said vehicle, light emanating from said illuminated lamps being transmitted through material containing a red colored pigment; and electrical conductor means by which said components are interconnected; said method comprising:

electric switching means actuated by actuation of said brake actuation means, said actuation of said electric switching means opening electric circuits between said source of electrical energy and said lamps effecting tail lights and rear turn signal lights, thereby preventing flow of energizing electric current through the said lamps, and closing electric circuits between said source of electrical energy and said brake signal lamps, thereby enabling energizing electric current to flow through said brake signal lamps, said flow of energizing electric current being constant except in the case that the closed electric circuit includes an actuated turn signal selector switch, in which case the said closed electric circuit also includes said turn signal flasher device, said flasher device causing said flow of energizing electric current to be intermittent, said actuation of the said electric switching means, and said effects thereof, ending upon release of the said brake actuation means.

2. A method to display red colored light only during braking as described in claim 1, wherein said electric switching means actuated by actuation of said brake actuation means comprise a spring-loaded single pole, double throw (SPDT) switch and a spring-loaded double pole, double throw (DPDT) switch.

3. A method to display red colored light only during braking as described in claim 1, wherein light emanating from lamps effecting said tail lights and from lamps effecting said rear turn signal lights is transmitted through material containing the same non-red colored pigment, said pigment causing said tail lights and said rear turn signal lights to be further transmitted as non-red light having the same color.

4. A method to display red colored light only during braking as described in claim 1, wherein light emanating from lamps effecting said tail lights and from lamps effecting said rear turn signal lights is transmitted through material containing different non-red colored pigments, said pigments causing said tail lights and said rear turn signal lights to be further transmitted as non-red lights having different colors.

5. A method to display red colored light only during braking as described in claim 1, wherein said tail lights and said rear turn signal lights are effected by illumination of bifunctional rear lamps on each side of the said automotive vehicle, light emanating from said illuminated lamps being transmitted through material containing a non-red colored pigment.

* * * * *